United States Patent [19]
Pinschmidt et al.

[11] Patent Number: 6,047,803
[45] Date of Patent: Apr. 11, 2000

[54] HOUSING FOR A PLATE CLUTCH

[75] Inventors: Udo Pinschmidt, Cölbe-Schönstadt; Thomas Rudolf, Dettelbach; Werner Selzam, Wipfeld; Claus Orth, Mönchstockheim; Horst Friedrich, Aidhausen/Happertshausen; Klaus Hofmann, Leuterhausen, all of Germany

[73] Assignee: Sachs Race Engineering GmbH, Schweinfurt, Germany

[21] Appl. No.: 09/335,830

[22] Filed: Jun. 18, 1999

[30] Foreign Application Priority Data

Jun. 19, 1998 [DE] Germany .......................... 198 27 340

[51] Int. Cl.[7] .............................. F16D 13/72; F16D 11/04
[52] U.S. Cl. ...................................... 192/70.12; 192/70.11
[58] Field of Search ............................. 192/70.12, 70.25, 192/70.11, 70.27

[56] References Cited

U.S. PATENT DOCUMENTS 5,638,932   6/1997   Mizukami ............................ 192/70.12

FOREIGN PATENT DOCUMENTS 718 517    6/1996   European Pat. Off. .
195 45 972 6/1997   Germany .

*Primary Examiner*—Charles A Marmor
*Assistant Examiner*—Tisha D. Waddell
*Attorney, Agent, or Firm*—Cohen, Pontani, Lieberman & Pavane

[57] ABSTRACT

A housing for a plate clutch having a toothed ring with a plurality of plate driving teeth which are arranged at an inner circumferential surface of the same so as to be distributed in the circumferential direction and which extend in a longitudinal direction of the ring. A flywheel is connected with the toothed ring at a first end of the same so as to rotate jointly therewith. A cover is connected with the toothed ring at a second end for joint rotation, wherein at least one of the flywheel and cover is connected with the toothed ring by a fastening arrangement. The fastening arrangement includes, in at least one of the plate driving teeth, a recess extending in the longitudinal direction of the ring and opening toward the one of either the flywheel and cover, and a fastening bolt element which is associated with this recess and which penetrates a fastening opening of either the flywheel or cover and projects into the associated recess. The fastening bolt element can be or is brought into a fastening engagement at a fastening portion of the same with a counter-fastening component. In this respect, it is further provided that the counter-fastening component has a counter-fastening portion which is arranged or can be arranged in the recess and by which the fastening portion of the fastening bolt element can be brought into a fastening engagement.

13 Claims, 3 Drawing Sheets

HOUSING FOR A PLATE CLUTCH

BACKGROUND OF THE INVENTION

1. Field of the Invention

The present invention relates to a clutch for a motor vehicle, and more particularly, to a housing for a multi-disk clutch or plate clutch.

2. Description of the Related Art

A plate clutch with a housing is known from DE 195 45 972 A1. There are axial recesses in a number of plate driving teeth; in this case, through-openings are provided which completely penetrate the teeth. Fastening bolts can be inserted into these through-openings and corresponding through-openings in the cover and in the flywheel. These fastening bolts contact one of the elements comprising the flywheel and cover with their head and project out over the other element and can be screwed together in this area with a threaded portion of the same by a fastening nut. The bolts accordingly serve at the same time to fasten the cover and to fasten the flywheel to the toothed ring.

In plate clutches of the type mentioned above which are generally used in the field of car racing, these clutches are required to be as lightweight as possible and to have the lowest possible moment of inertia. The expansion screws which serve to hold the housing together are relatively heavy structural component parts on the one hand because they must be made of steel or the like in order to hold as required and, in addition, lie in the radially outer region of the clutch so that they contribute to an unwanted increase in the moment of inertia.

SUMMARY OF THE INVENTION

It is an object of the present invention to provide a housing for a plate clutch in a motor vehicle, which can be constructed with the lowest possible mass and the lowest possible moment of inertia.

According to the invention, this and other objects are achieved by a housing for a plate clutch in a motor vehicle, comprising: a toothed ring with a plurality of plate driving teeth which are arranged at an inner circumferential surface of the same so as to be distributed in the circumferential direction and extend in a longitudinal direction of the ring; a flywheel which is connected with the toothed ring at a first end of the same so as to rotate jointly therewith; a cover which is connected with the toothed ring at a second end of the same for joint rotation, wherein at least one of the components comprising the flywheel and cover is connected with the toothed ring by a fastening arrangement which comprises, in at least one of the plate driving teeth, a recess which extends in the longitudinal direction of the ring and opens toward one of the components, and a fastening bolt element which is associated with this recess and which penetrates a fastening opening of one component and projects into the associated recess, which fastening bolt element can be or is brought into a fastening engagement at a fastening portion of the same with a counter-fastening component.

It is further provided in the housing according to the invention that the counter-fastening component has a counter-fastening portion which is arranged or can be arranged in the recess and by which the fastening portion of the fastening bolt element can be brought into fastening engagement.

In the housing according to the invention, since the counter-fastening component does not sit at the other axial end of the housing with reference to the insertion of the fastening bolt element, but rather is situated in the recess in an area lying closer to one component, it is accordingly possible to form the fastening bolt element, or every fastening bolt element, with a significantly shortened length. The reduction in the extension length of the fastening bolt element which is constructed, per se, from a heavy material contributes to a substantial reduction in the total mass of the housing and to a corresponding reduction in the moment of inertia. This even applies when both the flywheel and the cover are each connected separately to the toothed ring with corresponding fastening arrangements because, in sum, this results in a shorter total bolt length than in the prior art. Further, the housing according to the invention is particularly advantageous when, for example, one of the components comprising the cover and flywheel is fixedly connected with the toothed ring in another manner, e.g., by welding, since the other component can then be arranged at the toothed ring in an independent and detachable manner.

In order to achieve a more reliable hold of the one component at the toothed ring, it is preferable that the counter-fastening component comes into contact, or can be brought into contact, with a contact arrangement at the toothed ring when the counter-fastening portion is arranged in the recess in order to limit movement of the counter-fastening component in the direction of the one component.

Further, it is preferably provided that a hole-type through-opening is formed in at least one wall defining the recess in the at least one plate driving tooth. A wall area bordering the hole-type through-opening in the longitudinal direction of the ring forms at least a part of the contact arrangement, and that the counter-fastening component comprises a contact portion which can be or is brought into contact with the wall area when the counter-fastening portion is arranged in the recess.

In order to prevent a tilting of the counter-fastening component when producing the fastening state and to provide a secure holding of one component at the toothed ring, at least one through-opening is formed in two opposite wall regions and the counter-fastening component comprises two contact portions which are arranged in opposite directions with respect to the counter-fastening portion.

In order to make it possible to arrange the counter-fastening component at the toothed ring, the hole-type through-opening is formed in the at least one wall in a portion which is located at a distance from the component and which has an enlarged through-opening cross section for insertion of the counter-fastening component.

When through-openings are formed in two wall areas, it is particularly preferable that only one of the two through-openings is formed with an enlarged through-opening cross section in its area remote of the one component. The two wall areas preferably define the opening radially outside and radially inside.

The insertion of the counter-fastening component into the recess can be simplified when the one through-opening which has an enlarged through-opening cross section in some areas is provided in the wall defining the recess at the radial outer side.

In order to achieve a stable hold of the counter-fastening component in the recess, it is suggested that a cross-sectional shape of the counter-fastening portion substantially corresponds to a cross-sectional shape of the recess with reference to the longitudinal direction of the ring.

Frictional loads occur between the various components during operation of plate clutches outfitted with a housing of the type described above. However, in order to keep wear as low as possible in the area of the toothed ring, the counter-fastening component can be made from a softer material than the toothed ring.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will be described in more detail hereinafter with reference to the accompanying drawings by way of preferred embodiment forms.

DETAILED DESCRIPTION OF THE PRESENTLY PREFERRED EMBODIMENTS

Figure 8:
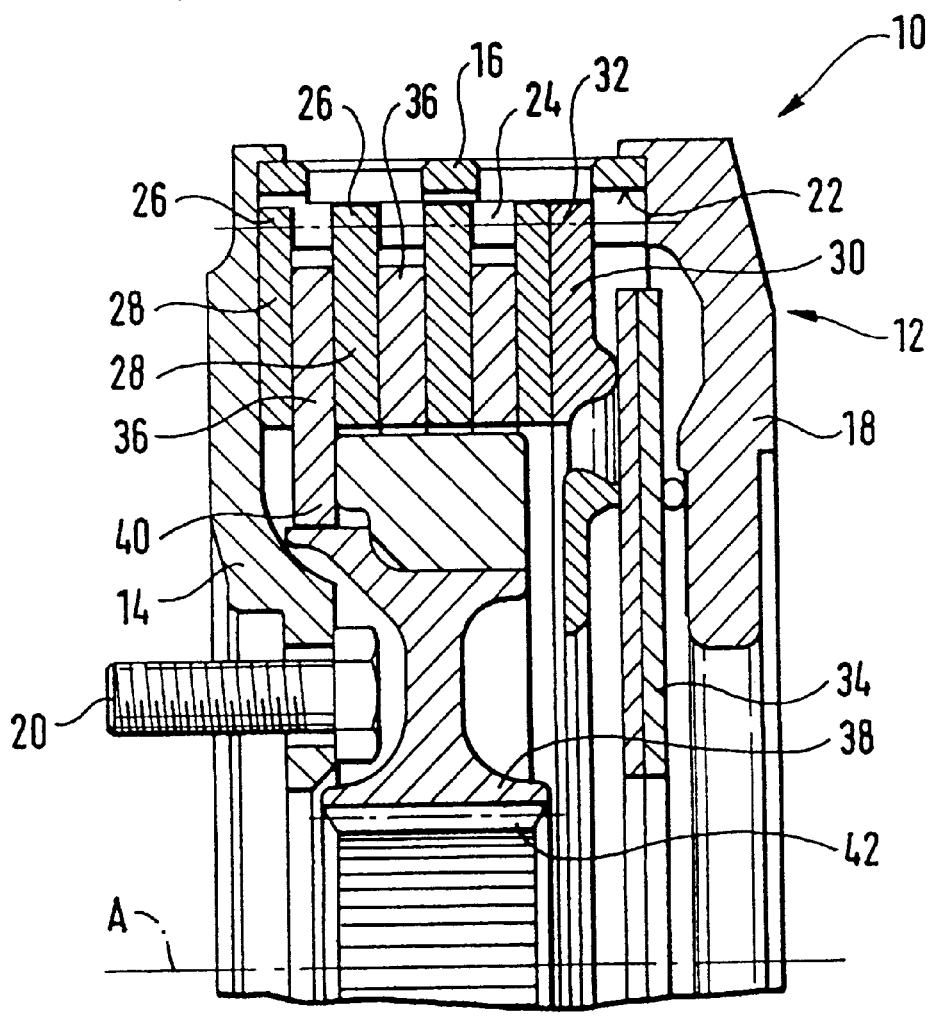
FIG. 8 is a sectional view depicting the principle structure of a plate clutch.

Before addressing the present invention in detail, the construction of a plate clutch will be described in general with reference to FIG. 8.

A plate clutch 10 comprises a housing, designated in general by 12, which is formed of a flywheel 14, a toothed ring 16 and a cover 18. The flywheel 14 can be screwed to a drive shaft, for example, a crankshaft of an internal combustion engine, by means of a plurality of screw bolts 20, so that the housing 12, driven by this drive shaft, will rotate about an axis of rotation A after being integrated in the drive system.

The toothed ring 16 has a plurality of plate driving teeth 24 distributed in the circumferential direction at an inner circumferential surface 22 of the toothed ring 16. The plurality of plate driving teeth 24 extend in a longitudinal direction of the ring corresponding to the extension direction of axis A. Outer teeth 26 of outer plates 28, four of which can be seen in FIG. 8, engage in the plate driving teeth 24. These outer plates 28 are accordingly connected with the housing 12 so as to be fixed with respect to rotation, but axially displaceable, relative to them. Further, a pressure plate 30 is connected, with the housing 12 via a corresponding outer toothing 32, so as to be fixed with respect to rotation, but axially displaceable, relative to it. An energy accumulator, in this case a diaphragm spring 34 which is held at the cover 18 in a manner known per se via spacers (not shown), acts between the pressure plate 30 and the cover 18. The diaphragm spring 34 presses in its radial outer region on the pressure plate 30, so that the latter in turn presses the outer plates 28, together with inner plates 36 arranged between the outer plates, in the direction of the flywheel 14. This contact pressing produces a torque-transmitting connection between the outer plates 26 which are connected with the housing 12 so as to be fixed with respect to rotation relative to it, and the inner plates 36 which are connected with a hub 38 so as to be fixed with respect to rotation relative to it. For this purpose, the inner plates 36 have an inner toothing 40 which engages with a corresponding outer toothing of the hub 38. This hub 38 further has an inner toothing 42 with which it can be brought into rotational engagement with a clutch output shaft, generally a transmission input shaft.

The above-described construction of the plate clutch 10 is known in general and it is noted that a number of modifications can be carried out in this construction with regard to arrangement, quantity and position of individual components, especially the outer and inner plates, the construction of the energy accumulator, etc. The principles of the present invention can be applied independent from variations in the plate clutch in these areas.

Figure 1:
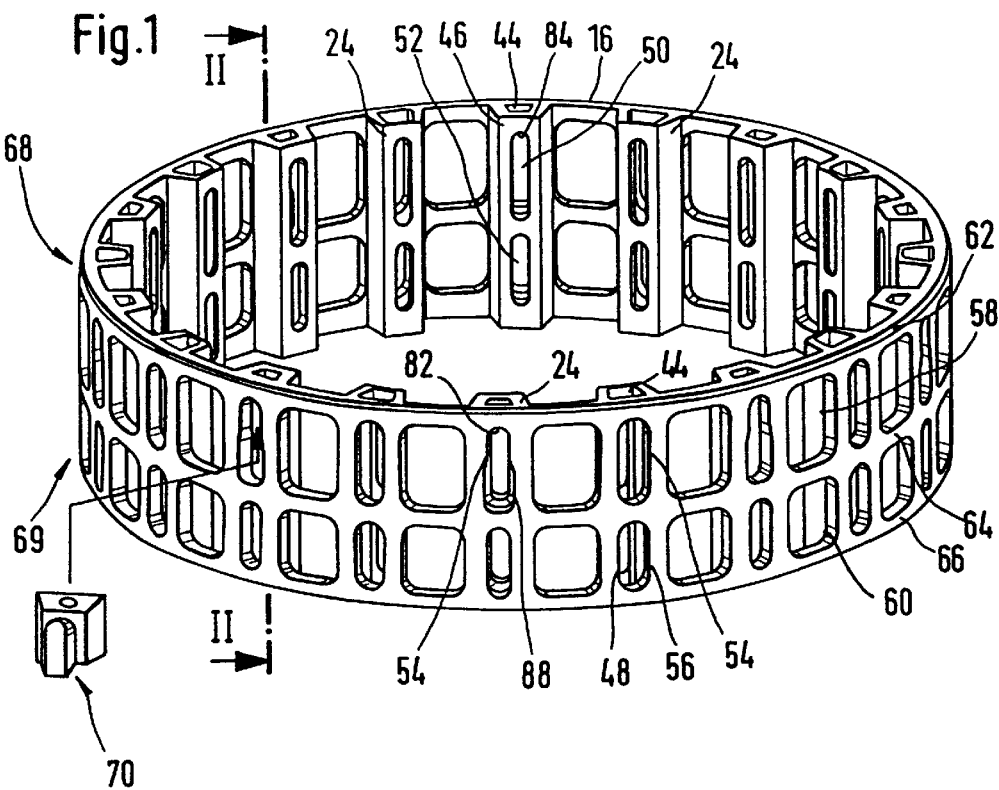
FIG. 1 is a perspective view of a toothed ring according to an embodiment of the invention.
Figure 2:
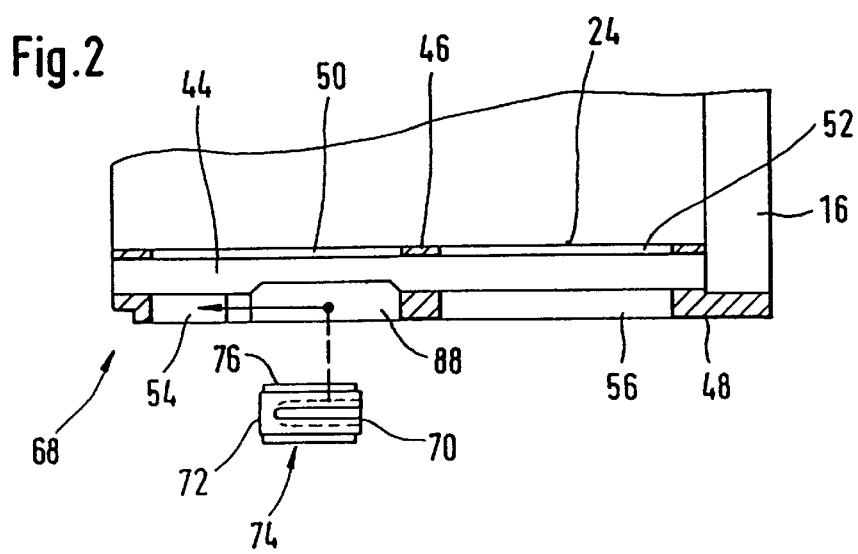
FIG. 2 is a sectional view of the toothed ring taken along line II—II in FIG. 1.
Figure 3:
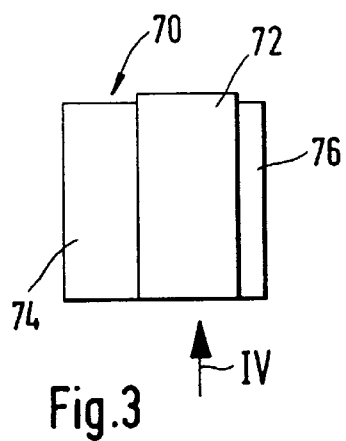
FIG. 3 is a side view of a fastening block according to the invention in a viewing direction II in FIG. 6.
Figure 6:
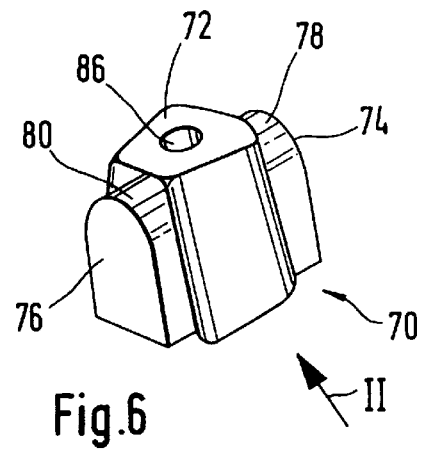
FIG. 6 is a perspective view of the fastening block according to an embodiment of the invention.
Figure 4:
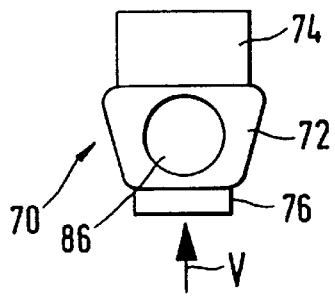
FIG. 4 is the fastening block shown in FIG. 3 viewed from direction IV in FIG. 3.
Figure 7:
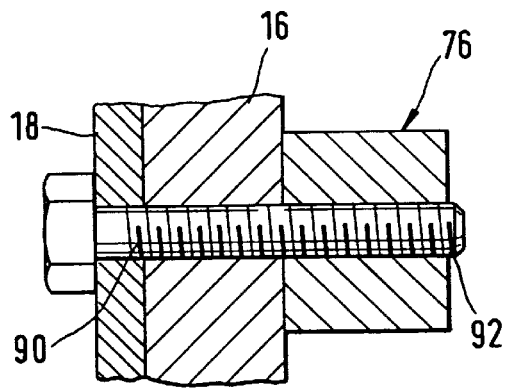
FIG. 7 is a sectional view showing the connection between the housing cover, toothed ring and fastening block by means of a fastening screw according to the invention.
Figure 5:
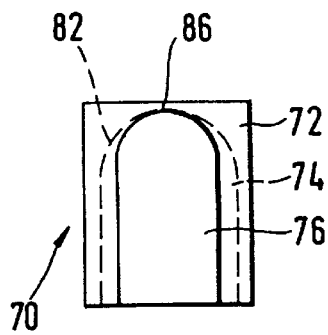
FIG. 5 is the fastening block shown in FIG. 4 viewed from direction V in FIG. 4.

FIG. 1 shows a perspective view of the toothed ring 16. It will be seen that the individual plate driving teeth 24 are hollow and have recesses or through-openings 33 which extend through the latter in the longitudinal direction of the ring. Further, each of the plate driving teeth 24 is open by means of through-openings 50, 52 (on the radial inside) and 54, 56 (on the radial outside) at a wall 46 which defines the recess 44 on the radial inside and a wall 48 which defines the recess 44 on the radial outside. Accordingly, it is possible to economize on weight, which is advantageous particularly when used in the field of car racing. Further, it will be seen that two through-openings 58, 60 are formed in each instance between two plate driving teeth 24 in the circumferential direction, so that material can also be saved in this respect. Therefore, it is ensured substantially by three web areas 62, 64, 66 extending continuously in the circumferential direction that the ring is held together, wherein a stiffening of the housing 12 formed in this way is achieved because of the connection of the toothed ring 16 with the cover 18 or flywheel 14 which will be described in the following.

It will be seen in FIG. 1 that the through-opening 54 in every second plate driving tooth 24, which is located between the webs 62, 64 and opens the recess 44 toward the radial outside and is close to the end 68 on the cover side, has an enlarged opening cross section at its end remote of the end area 68 of the toothed ring 16. A fastening block 70 serving to fix the cover 18 at the toothed ring 16 fits into this enlarged opening cross section. A fastening block 70 of this type is shown in FIGS. 3 to 6. It has a counter-fastening portion 72 with which the fastening block 70 is arranged in the recess 44 of the associated plate driving tooth 24. It will be seen that the cross-sectional shape of this counter-fastening portion 72 substantially corresponds to the cross-sectional shape of the recess 44. Two contact portions 74, 76 extend in the opposite direction away from the counter-fastening portion 72. The contour of the contact portions 74, 76 corresponds to the shaping of the through-openings 54 and 50 close to the end region 68. In particular, every contact portion 74, 76 has a bent surface region 78, 80 by which it can be brought into contact with a surface region 82, 84 of the radial outer through-opening 54 or radial inner through-opening 50. It will further be seen in the Figures that the contact portion 74 to be positioned in the radial outer through-opening 54 has a greater extension length and a greater width than the contact portion 76 to be positioned in the radial inner through-opening 50. This is because, for reasons of stability, the wall of the toothed ring is constructed so as to be thicker in the area of the webs 62, 64, 66 than the radial inner wall 46 of the teeth remaining after the recesses 44 are incorporated in the plate driving teeth 24. Further, it will be seen that the teeth taper inward radially, so that the surface area region remaining for the formation of the through-openings 50 in the region of every plate driving tooth 24 is smaller than a corresponding surface area region in the wall 48. Accordingly, every contact portion 74 and 76 is constructed such that, with respect to its width and extension length, it is adapted to the respective through-opening 54 and 55 after arrangement of the fastening block 70 in the recess 44 in the best possible manner in order to achieve the best possible contact, (i.e., the smallest area pressure) in the region of the curved surfaces 78, 80. In this way, the wear occurring in this area can be kept to a minimum.

It can further be seen in the Figures that an opening or bore hole 86 which is preferably formed as an internal threaded opening is provided in the counter-fastening portion 72. Screws 90 are screwed into this internal thread opening by their external thread portion 92 which is guided through corresponding through-openings in the cover 18 and in the axial direction into the recesses 44 in which the fastening blocks 70 are positioned. Therefore, when these screws are tightened, the fastening block 70, or every fastening block 70, can be moved and pretensioned in the axial direction toward the end 68 until it contacts the associated areas 82, 84 at the toothed ring 16 with its surface regions 78, 80 and accordingly forms a stop. In this way, it is possible to fasten the cover to the toothed ring with relatively short fastening screws, so that an appreciable savings in weight is provided in the region of these components.

The use of the fastening blocks 70 according to the invention is particularly preferred when the flywheel 14 is fixedly connected with the toothed ring by welding, so that no screw connection need be provided in this region. It is then possible by means of the arrangement according to the invention for fastening the cover 18 to the toothed ring 16 and removing the cover from the toothed ring in order to carry out maintenance work.

The fastening blocks 70 are guided from the radial outside through a region 88 of the through-openings 54 which has an enlarged through-opening cross section and is remote of the axial end 68 of the toothed ring 16. The radial inner through-opening 50 has a corresponding enlarged cross section, so that when inserted through the region 48 the fastening block 70 initially contacts the wall 46 by its counter-fastening portion 72 in the radial direction and, when the fastening screws are screwed into the opening 86 and tightened, is then axially moved in the direction of the end region 68 until the surface regions 78, 80 abut at the regions 82, 84 which are shaped in a complementary manner and the fastening block 70 lies in the region of the through-opening 54 which is not widened. As a result of to the shaping of the counter-fastening portion 72 and due to the presence of the contact portions 74, 76, it is ensured that every fastening block 70 is securely held at the toothed ring 16 so as to be free from rotation. However, since wear can occur in operation due to frictional forces, it is preferable that the fastening blocks 70 are made from a softer material than the toothed ring 16 which is preferably constructed from a titanium material (e.g., TiAl6V6). For example, it is conceivable that the fastening blocks 70 are produced from hard plastic or the like. A combination of materials is also possible, wherein the toothed ring 16 is again constructed from titanium material, (e.g., TiAl6V4) and the fastening blocks 70 are made of 50 CrV4.

Further, it will be seen from FIG. 1 that those recesses 44 in which a fastening block 70 is to be arranged are constructed with a smaller cross section than the recesses 44 which do not assist in connecting the cover to the toothed ring 16. Accordingly, a sufficient strength of the fastening block 70 can be ensured in the plate driving teeth 24 which serve to transmit torque to the plates as well as to receive a fastening block 70, whereas in the region of the other plate driving teeth 24, weight is minimized as far as possible. It is noted that, in principle, all of the plate driving teeth 24, or fewer than the plate driving teeth shown in FIG. 1, can be constructed to receive fastening blocks 70. It is likewise possible to fasten the flywheel 14 to the toothed ring 16 by means of fastening blocks to be arranged in the lower region of the recesses 44 with reference to FIG. 1 instead of or in addition to the connection of the cover 18 to the toothed ring 16 which was described above. In this case, the through-openings 56 are to be arranged with a correspondingly enlarged cross section in order to enable the insertion of the fastening blocks 70 in this region of the recess 44.

The invention is not limited by the embodiments described above which are presented as examples only but can be modified in various ways within the scope of protection defined by the appended patent claims.

We claim:

1. A housing for a plate clutch in a motor vehicle comprising:

a toothed ring having a plurality of plate driving teeth arranged at an inner circumferential surface thereof so as to be distributed in a circumferential direction and which extend in a longitudinal direction of the ring, said toothed ring having a first end and a second end;

a flywheel connected with said toothed ring at said first end so as to rotate jointly therewith;

a cover connected to the toothed ring at said second end to rotate jointly therewith; and a fastening arrangement for fastening at least one of said flywheel and said cover to said toothed ring, said fastening arrangement comprising:

a recess formed in at least one of said plurality of plate driving teeth and extending in a longitudinal direction of the ring and opening toward said at least one of said flywheel and said cover;

a counter-fastening component having a counter-fastening portion adapted to be arranged in said recess; and a fastening bolt element associated with said recess and having a fastening portion, said fastening bolt element penetrating a fastening opening of the at least one of said flywheel and said cover being fastened to said toothed ring and projects into said associated recess such that said fastening portion is capable of being brought into fastening engagement with said counter-fastening portion to secure said at least one of said flywheel and said cover to said toothed ring.

2. The housing for a plate clutch in accordance with claim 1, further comprising a radial inner wall areas and a radial outer wall, said two walls defining said recess.

3. The housing for a plate clutch in accordance with claim 2, wherein said toothed ring further comprises a contact arrangement, said counter-fastening component being brought into contact with said contact arrangement when said counter-fastening portion is arranged in said recess in order to limit movement of said counter-fastening component in a direction of the at least one of said flywheel and said cover.

4. The housing for a plate clutch in accordance with claim 3, wherein said recess further comprises at least one hole-type through-opening formed in at least one wall defining said recess and a wall area bordering said at least one hole-type through-opening in the longitudinal direction of the ring, said wall area forming at least part of said contact arrangement, said wherein said counter fastening component further comprises a contact portion capable of being brought into contact with said wall area when said counter-fastening portion is arranged in said recess.

5. The housing for a plate clutch in accordance with claim 3, wherein said recess further comprises at least one hole-type through-opening formed in two opposing wall regions defining said recess, said counter-fastening component comprising two stop portions arranged in opposing directions with respect to said counter-fastening portion.

6. The housing for a plate clutch in accordance with claim 4, wherein said at least one hole-type through-opening comprises a portion having an enlarged through-opening cross-section for receiving the said counter-fastening component in said recess.

7. The housing for a plate clutch in accordance with claim 5, wherein said at least one hole-type through-opening comprises a portion having an enlarged through-opening cross-section for receiving the said counter-fastening component in said recess.

8. The housing for a plate clutch in accordance with claim 6, wherein only one of said at least one hole-type through-openings are formed with said enlarge through-opening cross-section in its area remote from the at least one of said flywheel and said cover being attached to the toothed ring.

9. The housing for a plate clutch in accordance with claim 7, wherein only one of said at least one hole-type through-openings are formed with said enlarged through-opening cross-section in its area remote from the at least one of said flywheel and said cover being attached to the toothed ring.

10. The housing for a plate clutch in accordance with claim 8, wherein one of said at least one through-opening is formed in said outer radial wall.

11. The housing for a plate clutch in accordance with claim 9, wherein one of said at least one through-opening is formed in said outer radial wall.

12. The housing for a plate clutch in accordance with claim 1, wherein said counter-fastening portion comprises a cross-sectional shape substantially corresponding to a cross-sectional shape of said recess with reference to the longitudinal direction of the ring.

13. The housing for a plate clutch in accordance with claim 1, wherein said counter-fastening component is made from a softer material that that of said toothed ring.

* * * * *